(12) United States Patent
Homann

(10) Patent No.: US 6,857,813 B2
(45) Date of Patent: Feb. 22, 2005

(54) LOCK FOR RELEASABLY CONNECTING A HARDTOP WITH A BODY OF A VEHICLE

(75) Inventor: Bodo Homann, Heimsheim (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/228,102

(22) Filed: Aug. 27, 2002

(65) Prior Publication Data

US 2003/0059254 A1 Mar. 27, 2003

(30) Foreign Application Priority Data

Sep. 25, 2001 (DE) .......................................... 101 47 213

(51) Int. Cl.⁷ ................................................. B60J 7/10
(52) U.S. Cl. ..................................................... 403/349
(58) Field of Search ................................ 403/226, 227, 403/348–350; 296/216.01, 218

(56) References Cited

U.S. PATENT DOCUMENTS

| | | | | |
|---|---|---|---|---|
| 3,678,804 A | * | 7/1972 | Heyl | 91/507 |
| 3,898,716 A | | 8/1975 | Aylott | 24/573.11 |
| 4,377,020 A | * | 3/1983 | Vigo | 16/329 |
| 4,402,521 A | * | 9/1983 | Mongeon | 280/11.23 |
| 5,186,516 A | | 2/1993 | Alexander et al. | 296/121 |
| 5,779,383 A | * | 7/1998 | McCallum | 403/57 |
| 2002/0135220 A1 | * | 9/2002 | Yamaguchi et al. | |

FOREIGN PATENT DOCUMENTS

| | | | | |
|---|---|---|---|---|
| DE | 1205848 | | 11/1965 | |
| DE | 1284159 | | 11/1968 | |
| DE | 2239301 | | 2/1974 | |
| DE | 3640483 | | 12/1987 | |
| DE | 19736508 | | 2/1999 | |
| DE | 19736508 | | 4/1999 | |
| DE | 197 53 736 | * | 6/1999 | |
| EP | 0188991 | | 12/1985 | |
| EP | 0188991 | | 7/1986 | |
| EP | 0897822 | | 2/1999 | |
| EP | 1 295 746 A | * | 3/2003 | |
| FR | 2791007 | | 9/2000 | |
| GB | 1405979 | | 9/1975 | |
| GB | 2269848 | | 2/1994 | |
| GB | 2307715 | | 6/1997 | |
| GB | 2 307 715 A | * | 6/1997 | |
| JP | 406227261 A | * | 8/1994 | .................. 296/218 |
| JP | 2000309225 A | * | 11/2000 | |

OTHER PUBLICATIONS

Search Report.

* cited by examiner

*Primary Examiner*—James R. Brittain
(74) *Attorney, Agent, or Firm*—Crowell & Moring LLP

(57) ABSTRACT

A lock includes a plug-type pin, which is rotatably held in a stationary receiving sleeve fastened to the hardtop. A spring element is provided between the sleeve and a contact disk. The plug-type pin has a link pin on one end side which can be locked while introduced in a helical guideway of a stationary link element of the vehicle body. On the head side, the plug-type pin has a transversely situated holding pin, which can be adjusted on face-side guideways of the receiving sleeve into an open and closed position against the tension of an elastomer spring arranged between the contact disk and the receiving sleeve.

7 Claims, 3 Drawing Sheets

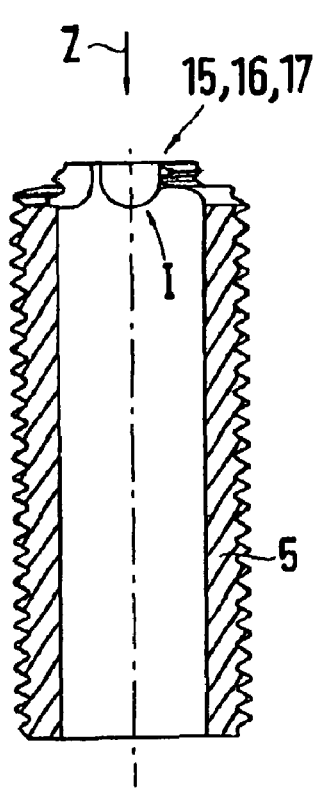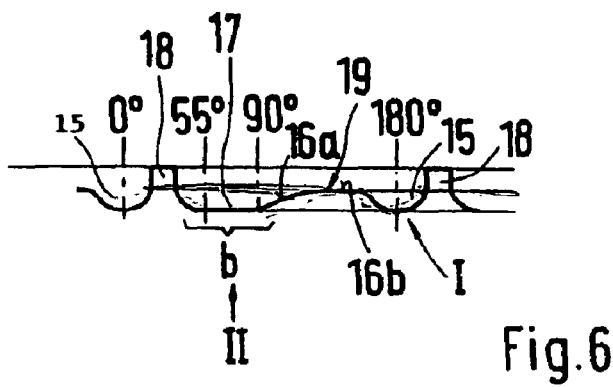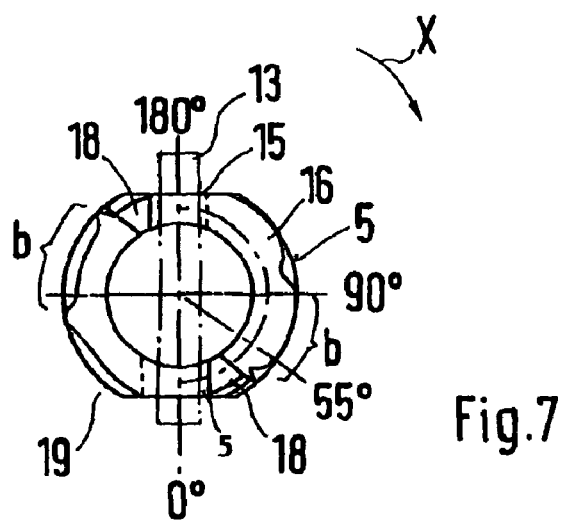
Fig.5
Fig.6
Fig.7

LOCK FOR RELEASABLY CONNECTING A HARDTOP WITH A BODY OF A VEHICLE

BACKGROUND AND SUMMARY OF THE INVENTION

This application claims the priority of German Application No. 101 47 213.7, filed Sep. 25, 2001, the disclosure of which is expressly incorporated by reference herein.

The invention relates to a lock for releasably connecting a hardtop with a body of a vehicle by way of a plug-type pin. In particular, the lock has a pin which is rotatably held in a stationary receiving sleeve fastened to the hardtop. A spring element is provided between the sleeve and a contact disk. The plug-type pin has a link pin on the end side, which can be locked while introduced in a helical guideway of a stationary link element of the vehicle body.

From German Patent document DE 197 36 508 C2, a lock is known for releasably connecting a hardtop with a body of a vehicle. This lock comprises a plug-type pin connected with a handle, which plug-type pin has a retention pin guided in a link element as well as a contact pin which is held at the head-side of a hollow screw in a transverse groove.

It is an object of the invention to provide an improved lock for a hardtop which ensures a secure releasable connection of the hardtop with a body of a vehicle. Furthermore, the inventive lock is held in the operating position, during driving in a noiseless manner.

According to the invention, this object is achieved by a lock for detachably connecting a hardtop with a body of a vehicle by way of a plug-type pin which is rotatably held in a stationary receiving sleeve fastened to the hardtop. A spring element is provided between the sleeve and a contact disk. The plug-type pin has a link pin on the end side, which can be locked while introduced in a helical guideway of a stationary link element of the vehicle body. On a head side, the plug-type pin has a transversely situated holding pin, which can be adjusted on face-side guideways in the receiving sleeve into an opening and closing position (I and II) against the tension of an elastomer spring. The spring is arranged between the contact disk and the receiving sleeve. Additional advantageous characteristics are described herein.

The principal advantages according to the invention are that, as a result of the guiding of the plug-type pin on a defined guideway during the opening and closing of the hardtop, a secured open position is taken up and, from this position, the plug-type pin can be changed into a closed position. The latter is somewhat free-floating, so that a link pin is held securely and without noise in a body-fixed link element in the closed position.

In particular, these advantages are achieved in that the plug-type pin has a transversely situated holding pin on a head-side, which holding pin can be adjusted on face-side guideways in the receiving sleeve into an opening and closing position against the tension of an elastomer spring arranged between the contact disk and the receiving sleeve. As a result, it is advantageously achieved according to the invention that, on the one hand, by using the elastomer spring in contrast to a metal spring according to the prior art, rattling noises in coordination with the adjusting movements of the plug-type pin are avoided. This is also aided by the fact that, according to the invention, the plug-type pin has a pin section with a first step on which an integrated elastic sleeve is arranged. The elastic sleeve is supported at the pin end part in a second step and extends approximately from the contact disk to the transverse pin. As a result, possible tolerances and, therefore, the generation of noises, are avoided between the plug-type pin and the link element during the closing operation. Furthermore, the elastic sleeve has a thicker diameter on its end pointing toward the disk, in contrast to the additional outside diameter of the sleeve. This thicker diameter is required in order to fill the beveling or the input-side widening of the bore in the link element in the closing operation.

The face-side guideways for the holding pin in the outer sleeve consist of semicircular detent receiving devices (for an open position of the lock) situated opposite one another in the head of the receiving sleeve for the holding pin. The detent receiving devices are adjoined by ramps which change into trough-shaped recesses in which the holding pin takes up a closing or retention position. As a result of this construction of the face-side guideways, corresponding to the diameter of the holding pin, as semicircular detent receiving devices as well as of the adjoining ramps with a defined length and of the recesses which follow, on the one hand, a precise opening position is achieved. And, on the other hand, a closing position is ensured which provides a locking into the end-side receiving device of the guideway having a defined length in the link element.

In particular, it is provided according to the invention that the semicircular detent receiving devices are bounded by upright webs, and these detent receiving devices have approximately the same depth as the trough-shaped recesses, the ramps having approximately half the depth of the detent receiving devices and of the recesses. On the end side, the upright webs bound, on the one hand, the semicircular detent receiving devices and, on the other hand, the trough-shaped recesses.

The ramps have adjoining flat sections which originate from the semicircular detent receiving devices and which correspond approximately to half the depth of the detent receiving devices which have diagonally extending surfaces dropping off to the trough-shaped recesses. As a result of the construction of the ramps, an easier rotation of the plug-type pin is permitted from the closed position to the open position and thus an easier operation of the lock.

The swivelling of the plug-type pin takes place along the helical guideway in the stationary link element, the plug-type pin being guided by way of the noise-reducing and tolerance-compensating elastic sleeve in the bore of the link element.

An operation of the plug-type pin of the lock for the purpose of a rotation takes place, for example, by using a handling tool, such as an outside hexagon wrench which engages into a hexagonal recess of the plug-type pin.

Other objects, advantages and novel features of the present invention will become apparent from the following detailed description of the invention when considered in conjunction with the accompanying drawings.

BRIEF DESCRIPTION OF THE DRAWINGS

FIG. 5 is a sectional view of an enlarged receiving sleeve with face-side guideways;

FIG. 6 is a profiled view of the guideways in the receiving sleeve; and

FIG. 7 is a top view of the receiving sleeve in the direction of the arrow Z shown in FIG. 5.

DETAILED DESCRIPTION OF THE DRAWINGS

Figure 1:
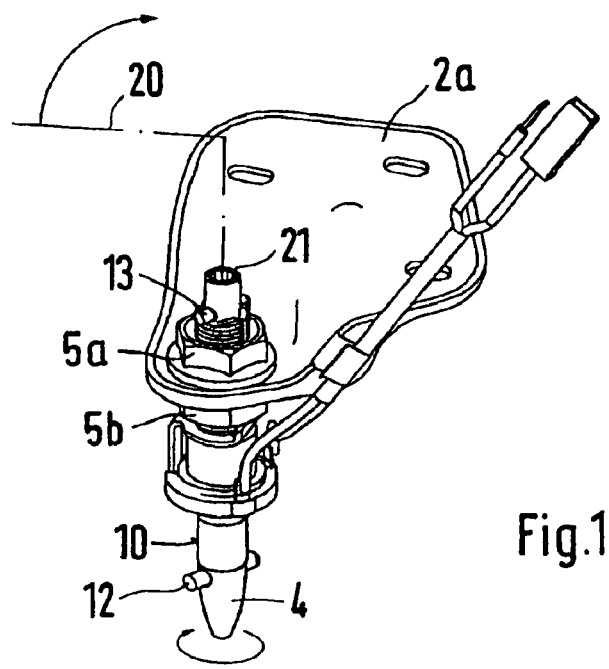
FIG. 1 is a perspective diagrammatic view of a lock for a hardtop according to the invention.
Figure 2:
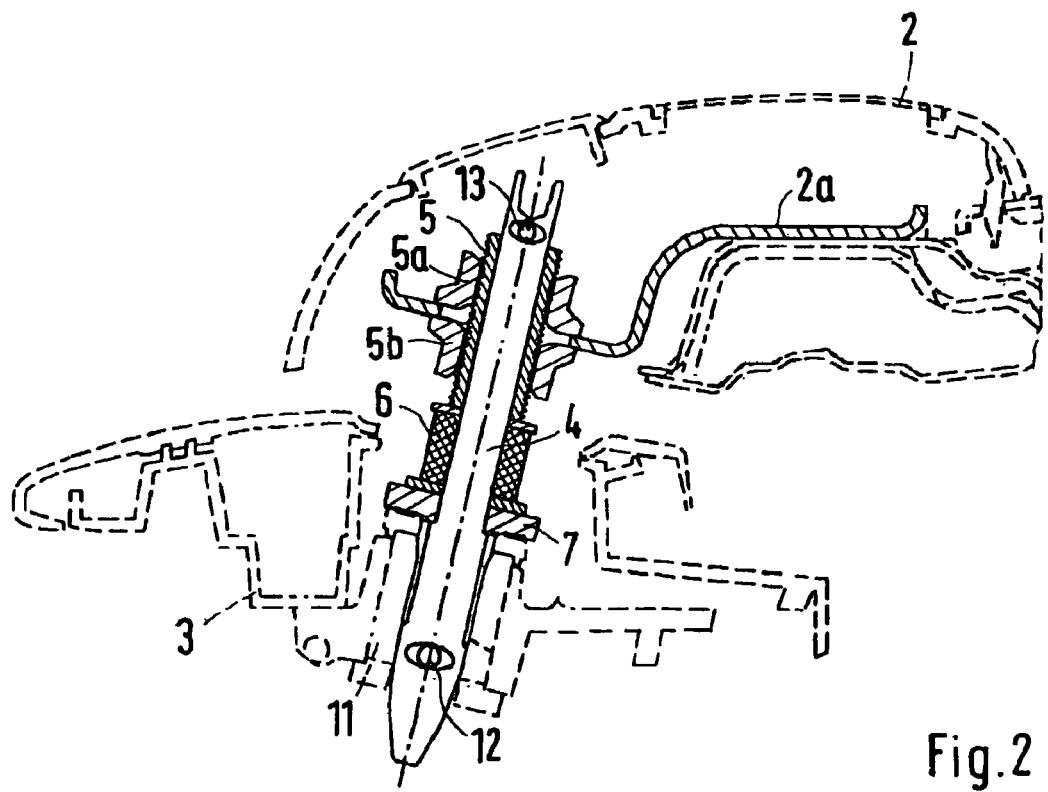
FIG. 2 is a sectional view of an installed lock in the closed position in the stationary link element of the vehicle body.
Figure 3:
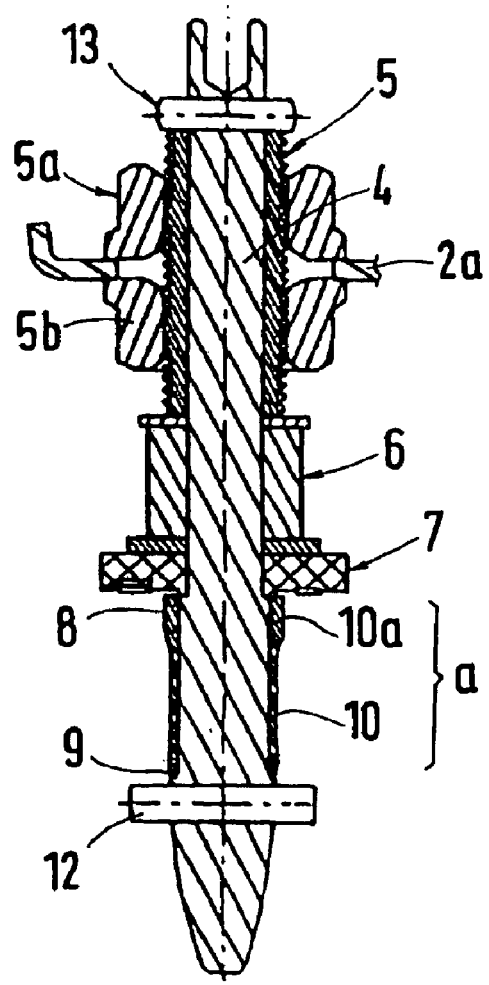
FIG. 3 is an enlarged sectional view of the lock.
Figure 4:
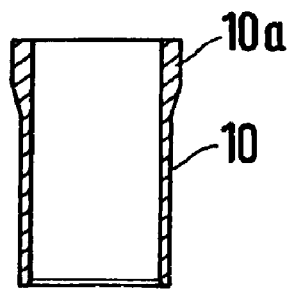
FIG. 4 is a sectional view of an elastic sleeve of the plug-type pin.

A lock for releasably connecting a hardtop 2, 2a with a body 3 of a vehicle comprises essentially a plug-type pin 4. The latter is rotatably arranged in a receiving sleeve 5 fixedly connected with the hardtop 2, 2a by way of screw nuts 5a, 5b. An elastomer spring 6 is arranged between the receiving sleeve 5 and a contact disk 7 fixed to the plug-type pin 4.

For supporting the contact disk 7, the plug-type pin 4 has a first step 8. A second step 9 is provided at a distance "a" from the first step 8 on the pin 4. On the second step 9, an elastic sleeve 10 is supported, which extends to the first step 8 of the plug-type pin 4.

For holding the hardtop 2 together with the body 3 of the vehicle, the plug-type pin 4 is pushed into a vehicle-body-side link element 11, which has a helical guideway (not shown), in which a transversely arranged link pin 12 of the plug-type pin 4 engages. A holding pin 13 is arranged transversely in the head of the plug-type pin 4 and is aligned with the link pin 12. The holding pin 13 is guided, under tension from the elastomer spring 6, in guideways 15, 16, 17 into an opening position I and a closing position II (see FIGS. 5 and 6).

FIG. 6 illustrates the course of the guideways 15, 16, 17 in detail in a developed view, in which case semicircular detent receiving devices for receiving the holding pin 13 are provided at 0 and 180°; that is, as illustrated in detail in FIG. 7, the two free ends of the holding pin 13 are each held in the detent receiving devices 15 in the opening position I. When the holding pin 13 is rotated in the direction of the arrow X into the closed position II, the pin 13 overcomes ramps 16 and then falls under the tension of the elastomer spring 6 into trough-shaped receiving devices 17, which have a length b. This length b is required in order to ensure a locking into the end-side receiving device of the guideway in the link element 11, which guideway also has a certain length. The intermediate ramps 16 are approximately half as high as the receiving devices 15, 17. Beginning from the receiving devices 17, the ramps 16 have approximately diagonally sloping guiding surfaces 16a which change into flat guiding surfaces 16b before dropping-off into the detent receiving devices 15. The detent receiving devices 15 each have a boundary formed by an upright web 18.

The operation of the lock takes place by using a handling tool 20 which has a hexagonal shape, for example, which can be introduced into a hexagonal recess 21 of the plug-type pin 4. By rotating the tool 20, the plug-type pin 4 is correspondingly swivelled into positions I and II.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lock for detachably coupling a hardtop with a vehicle body, the lock comprising:
   a plug-type pin;
   a stationary receiving sleeve fastened to the hardtop, the plug-type pin being rotatably held in the stationary receiving sleeve;
   a contact disk fixedly arranged on the plug-type pin between ends thereof;
   an elastomer spring arranged between the contact disk and the stationary receiving sleeve;
   a stationary link element having a helical guideway, the stationary link element being arranged on the vehicle body;
   a link pin arranged on a tail-end side of the plug-type pin, the link pin being lockable when introduced into the helical guideway of the stationary link element;
   a holding pin arranged transversely on a head-end side of the plug-type pin; and guideways provided on the receiving sleeve to interact with the holding pin, the holding pin being adjustable on the guideways into an opening and closing position against tension from the elastomer spring;
   wherein the plug-type pin has first and second steps, the contact disk being held on the first step; and
   wherein a sleeve is supported on the second step situated near the link pin, the sleeve extending approximately from the contact disk to the link pin.

2. A lock for detachably coupling a hardtop with a vehicle body, the lock comprising:
   a plug-type pin;
   a stationary receiving sleeve fastened to the hardtop, the plug-type pin being rotatably held in the stationary receiving sleeve;
   a contact disk fixedly arranged on the plug-type pin between ends thereof;
   an elastomer spring arranged between the contact disk and the stationary receiving sleeve;
   a stationary link element having a helical guideway, the stationary link element being arranged on the vehicle body;
   a link pin arranged on a tail-end side of the plug-type pin, the link pin being lockable when introduced into the helical guideway of the stationary link element;
   a holding pin arranged transversely on a head-end side of the plug-type pin; and guideways provided on the receiving sleeve to interact with the holding pin, the holding pin being adjustable on the guideways into an opening and closing position against tension from the elastomer spring;
   wherein the semicircular detent receiving devices are, in each case, bounded by an upright web, the detent receiving devices having a depth corresponding to a depth of the trough-shaped recesses; and
   wherein the ramps have a depth approximately half that of the detent receiving devices and the trough-shaped recesses;
   wherein the plug-type pin has first and second steps, the contact disk being held on the first step; and
   wherein a sleeve is supported on the second step situated near the link pin, the sleeve extending approximately from the contact disk to the link pin.

3. A lock for detachably coupling a hardtop with a vehicle body, the lock comprising:
   a plug-type pin;
   a stationary receiving sleeve fastened to the hardtop, the plug-type pin being rotatably held in the stationary receiving sleeve;
   a contact disk fixedly arranged on the plug-type pin between ends thereof;
   an elastomer spring arranged between the contact disk and the stationary receiving sleeve;

a stationary link element having a helical guideway, the stationary link element being arranged on the vehicle body;

a link pin arranged on a tail-end side of the plug-type pin, the link pin being lockable when introduced into the helical guideway of the stationary link element;

a holding pin arranged transversely on a head-end side of the plug-type pin; and guideways provided on the receiving sleeve to interact with the holding pin, the holding pin being adjustable on the guideways into an opening and closing position against tension from the elastomer spring;

wherein the ramps, in each case, beginning from a respective semicircular detent receiving device, have an adjoining flat section corresponding approximately to half the depth of the detent receiving devices, the ramps then having a descending diagonal guide surface toward a respective trough-shaped recess;

wherein the plug-type pin has first and second steps, the contact disk being held on the first step; and wherein a sleeve is supported on the second step situated near the link pin, the sleeve extending approximately from the contact disk to the link pin.

4. A lock according to claim 1, wherein the sleeve is an elastic sleeve and has a thicker diameter on a portion nearer the contact disk.

5. A lock according to claim 2, wherein the sleeve is an elastic sleeve and has a thicker diameter on a portion nearer the contact disk.

6. A lock according to claim 3, wherein the sleeve is an elastic sleeve and has a thicker diameter on a portion nearer the contact disk.

7. A lock for detachably coupling a hardtop with a vehicle body, the lock comprising:

a plug-type pin;

a stationary receiving sleeve fastened to the hardtop, the plug-type pin being rotatably held in the stationary receiving sleeve;

a contact disk fixedly arranged on the plug-type pin between ends thereof;

an elastomer spring arranged between the contact disk and the stationary receiving sleeve;

a stationary link element having a helical guideway, the stationary link element being arranged on the vehicle body;

a link pin arranged on a tail-end side of the plug-type pin, the link pin being lockable when introduced into the helical guideway of the stationary link element;

a holding pin arranged transversely on a head-end side of the plug-type pin; and guideways provided on the receiving sleeve to interact with the holding pin, the holding pin being adjustable on the guideways into an opening and closing position against tension from the elastomer spring;

wherein the plug-type pin has a recessed hexagonal female coupling in the head-side end adapted to couple with a hexagonal handling tool used to rotate the plug-type pin.

* * * * *